(12) United States Patent
Aoshima (10) Patent No.: US 6,317,562 B1
(45) Date of Patent: Nov. 13, 2001

(54) LENS DRIVING APPARATUS

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/213,262

(22) Filed: Dec. 17, 1998

(30) Foreign Application Priority Data

Dec. 25, 1997 (JP) .................................................. 9-357860

(51) Int. Cl.[7] ............................ G03B 3/10; G03B 13/34; G03B 17/00
(52) U.S. Cl. ............................................. 396/72; 396/133
(58) Field of Search ................................ 396/72, 75, 85, 396/133; 310/164, 257, 49 R (56) References Cited

U.S. PATENT DOCUMENTS

| | | | |
|---|---|---|---|
| 3,508,091 | * | 4/1970 | Kavanaugh ........................... 310/164 |
| 4,767,958 | * | 8/1988 | Sasaki ................................... 310/257 |
| 5,241,422 | * | 8/1993 | Shimada et al. ........................ 359/85 |
| 5,489,958 | * | 2/1996 | Katagiri et al. ....................... 396/133 |
| 5,594,518 | * | 1/1997 | Ohshita ................................. 396/133 |
| 5,831,356 | * | 11/1998 | Aoshima ............................. 310/49 R |
| 5,860,030 | * | 1/1999 | Tada et al. .............................. 396/72 |
| 5,937,215 | * | 8/1999 | Mogamiya .............................. 396/85 |

* cited by examiner

Primary Examiner—Christopher E. Mahoney
(74) Attorney, Agent, or Firm—Fitzpatrick, Cella, Harper & Scinto (57) ABSTRACT

An optical apparatus includes a movable lens unit, a rotatable lead screw moving the movable lens unit, and a motor driving the rotatable lead screw. In the optical apparatus, the center of the motor and the center of the lead screw are disposed so as to be approximately aligned on the same circumference of a circle that is centered on an optical axis of a lens in the movable lens unit. In another aspect of the invention, a holding member positions both the lead screw and the motor, so as to dispose the lead screw and the motor in a direction parallel to an optical axis of the movable lens unit.

34 Claims, 7 Drawing Sheets

LENS DRIVING APPARATUS

BACKGROUND OF THE INVENTION

1. Field of the Invention

The present invention relates to a driving apparatus utilizing a motor as a driving source, for particular use in an optical apparatus, for example.

2. Related Background Art

Hitherto, an apparatus shown in FIG. 9 was known as a lens driving apparatus for a still camera, a video camera, and the like. Referring to FIG. 9, a lead screw 102 is connected to the output shaft (not shown) of a step motor 101. A frame 103 rotatably holds the ends of the lead screw 102 and fixes or secures the step motor 101 as well. The frame 103 is fixed to a bottom board (not shown).

A lens frame 105 has an arm portion, including an internal thread engaged with the lead screw 102. The lens frame 105 fixes or holds a lens 104. Also, the lens frame 105 can move in the direction of the optical axis of the lens, while rotation about the lens optical axis is restricted by a bottom board (not shown).

In a lens driving apparatus constructed as discussed above, when the lead screw 102 is rotated by the step motor 101, the lens frame 105, which is engaged with the lead screw 102 at the internal screw portion, is moved. Consequently, the lens 104 is moved in the back and forth directions of the optical axis, corresponding to the revolution of the step motor 101. By this back and force motion, focusing, zooming, etc., can be achieved.

A conventional step motor is shown in FIG. 10. A stator coil 115 is concentrically wound around a bobbin 111. The bobbin 111 is clamped between two stator yokes 116 in the axial direction. In the stator yokes 116, stator teeth 116a and 116b are alternately disposed in the circumferential direction of the internal radius of the bobbin 111.

The stator yoke 116 is integrally fixed, in a case 113a or 113b, with the stator teeth 116a or the stator teeth 116b. Thus, the stator 112 includes the bobbin 111, the stator coil 115, and stator yoke 116.

A flange 125 and a bearing 118a are fixed to the case 113a, while a second bearing 118b is fixed to another case 113b. A rotor 119 has a rotor shaft (output shaft) 120 and rotor magnets 121, fixed to the rotor shaft 120. Gaps are radially formed between the rotor magnets 121 and the stator tooth 116a of the stator 112. The driving shaft 120 is rotatably supported by the two bearings 118a and 118b.

SUMMARY OF THE INVENTION

According to one aspect of the present invention, an optical apparatus comprises a movable lens unit, a rotatable lead screw moving the movable lens unit, and a motor driving the rotatable lead screw. The optical apparatus is configured such that the center of the motor and the center of the lead screw are disposed so as to be approximately aligned on the same circumference of a circle centered on an optical axis of a lens in the movable lens unit.

According to another aspect of the present invention, an optical apparatus comprises a step motor including: (i) a magnet formed in a cylindrical shape, wherein at least the external magnet periphery is circumferentially divided into multiple portions, and wherein each of the multiple portions are alternately magnetized into north and south magnetic poles; (ii) first and second coils provided in the axial direction of the magnet, wherein the first coil is disposed on a first side of the magnet, and the second coil is disposed on a second side of the magnet; (iii) a first external magnet pole, magnetized by the first coil and opposed to the external periphery of a first end of the magnet; (iv) a first internal magnetic pole, magnetized by the first coil and opposed to the internal periphery of the first end of the magnet; (v) a second external magnet pole, magnetized by the second coil and opposed to the external periphery of a second end of the magnet; and (vi) a second internal magnet pole, magnetized by the second coil and opposed to the internal periphery of the second end of the magnet.

According to still another aspect of the present invention, an optical apparatus comprises a movable lens unit, a rotatable lead screw moving the movable lens unit, and a step motor driving the rotatable lead screw. In the optical apparatus, the step motor comprises two coils disposed in the axial direction of the lead screw.

According to a further aspect of the present invention, an optical apparatus comprises a movable lens unit, a rotatable lead screw moving the movable lens unit, and a step motor driving the rotatable lead screw. The step motor comprises: (i) a magnet formed in a cylindrical shape, wherein at least the external magnet periphery is circumferentially divided into multiple portions, and wherein each of the multiple portions are alternately magnetized into different magnetic poles; (ii) first and second coils provided in the axial direction of the magnet, wherein the first coil is disposed on a first side of the magnet, and the second coil is disposed on a second side of the magnet: (iii) a first external magnet pole, magnetized by the first coil and opposed to the external periphery of a first end of the magnet; (iv) a first internal magnetic pole, magnetized by the first coil and opposed to the internal periphery of the first end of the magnet; (v) a second external magnet pole, magnetized by the second coil and opposed to the external periphery of a second end of the magnet; and (vi) a second internal magnet pole, magnetized by the second coil and opposed to the internal periphery of the second end of the magnet, wherein the step motor is disposed in a direction parallel to the lead screw.

According to another aspect of the present invention, a driving apparatus comprises a movable display member unit, a rotatable lead screw moving the movable display unit, a motor driving the rotatable lead screw, and a holding member which holds both the rotatable lead screw and the motor so that the rotatable lead screw and the motor are disposed in a side-by-side, parallel arrangement.

According to still another aspect of the present invention, a driving apparatus comprises a step motor including: (i) a magnet formed in a cylindrical shape, wherein at least the external magnet periphery is circumferentially divided into multiple portions, and wherein each of the multiple portions are alternately magnetized into north and south magnetic poles; (ii) first and second coils provided in the axial direction of the magnet, wherein the first coil is disposed on a first side of the magnet, and the second coil is disposed on a second side of the magnet; (iii) a first external magnetic pole, magnetized by the first coil and opposed to the external periphery of a first end of the magnet; (iv) a first internal magnetic pole, magnetized by the first coil and opposed to the internal periphery of the first end of the magnet; (v) a second external magnetic pole, magnetized by the second coil and opposed to the external periphery of a second end of the magnet; and (vi) a second internal magnetic pole, magnetized by the second coil and opposed to the internal periphery of the second end of the magnet.

BRIEF DESCRIPTION OF THE DRAWINGS

FIG. 1 is an exploded and perspective view of a lens driving apparatus according to the first embodiment of the present invention;

FIG. 2 is a perspective diagram illustrating the positioning of the FIG. 1 lens driving apparatus in a lens barrel;

FIG. 3 is a perspective view illustrating the positioning of the FIG. 1 lens driving apparatus in the lens barrel;

FIG. 4 is an exploded and perspective view of a step motor utilized in the FIG. 1 lens driving apparatus;

FIG. 5 is a cross-section view of the FIG. 4 step motor;

FIGS. 6A–6D are cross-section views illustrating the relationship between the stator and rotor of the FIG. 4 step motor;

FIGS. 7A–7D are cross-section views illustrating the relationship between the stator and rotor of the FIG. 4 step motor;

FIG. 8 is a perspective view of a lens driving apparatus according to the second embodiment of the present invention;

FIG. 9 is a perspective view of a conventional lens driving apparatus: and

FIG. 10 is a cross-section view of a conventional step motor.

DESCRIPTION OF THE PREFERRED EMBODIMENTS

First Embodiment

Figure 1:
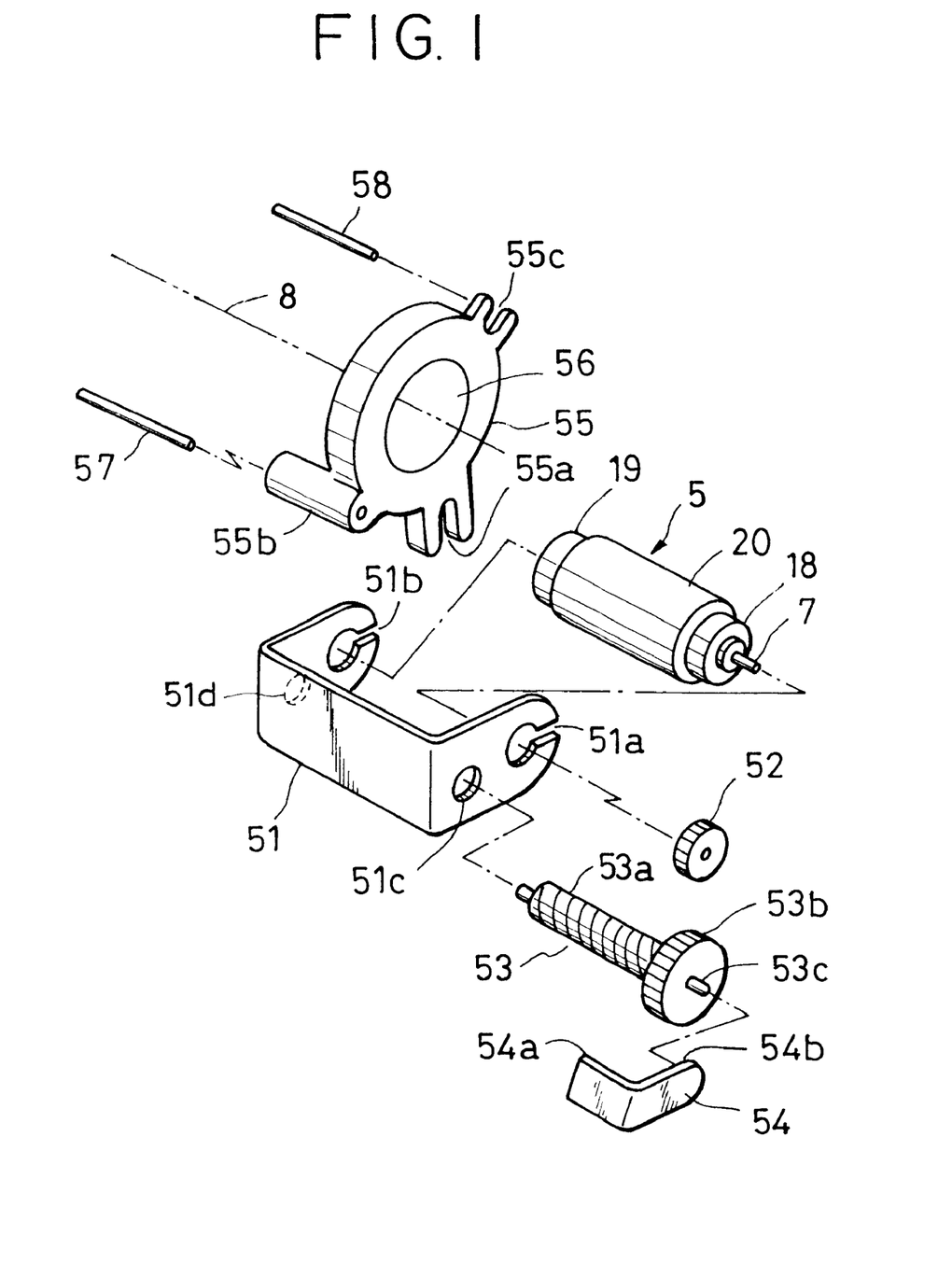

FIG. 1 is an exploded view of a lens driving apparatus according to a first embodiment of the present invention. In FIG. 1, a step motor 5 has body portions 18, 19, and 20, and a output shaft 7, protruding from one end of the step motor 5. A detailed configuration of the step motor 5 will be described below.

A frame 51 is formed by folding a sheet-like member in a U shape. The frame 51 includes holding apertures 51a and 51b, at each end of frame 51, to mate with and to hold the ends of the step motor body portions 18–20.

A pinion gear 52 is secured to the output shaft 7 of the step motor 5. A lead screw shaft (a driving shaft) 53 has a lead screw portion 53a. The length of the lead screw portion 53a is equal to or greater than the length of the body portions 18–20 of the step motor 5. The lead screw a shaft 53 is rotatably fitted, mated with, and held by holding apertures 51c and 51d, formed at each end of the frame 51, respectively. Thus, by the frame 51 configuration, the step motor 5 and the lead screw shaft 53 are disposed in a direction parallel to each other, or in other words, they are disposed side-by-side in a radial direction (i.e., a parallel arrangement).

At one end of the lead screw shaft 53, a gear portion 53b is formed to engage or mesh with the pinion gear 52. Therefore, when the step motor 5 rotates, the lead screw shaft 53 is rotated, by the engagement of the pinion gear 52 with the gear portion 53b. Means for transmission, a term used in the present invention, includes the gear portion 53b and the pinion gear 52.

A base end 54a of a L-shaped plate spring 54 is secured to the frame 51, while an arm portion 54b (of the L-shaped plate spring 54) urges an end portion 53c of the lead screw shaft 53. Accordingly, the lead screw shaft 53 is disposed in one side of the frame 51 to eliminate play between the base end 54a and the end portion 53c in a thrusting direction.

A lens 56 has an optical axis 8 and is held by a lens holder (a driven member) 55. The lens holder 55 includes an engaging portion 55a, having an internal thread, which engages the lead screw portion 53a of the lead screw shaft 53.

The lens holder 55 further includes a guide aperture portion 55b and a swing-stopping slot portion 55c, which are slidably fitted with guide-bars 57 and 58, respectively. Guide bars 57 and 58 are held by a bottom board (not shown). Therefore, the lens holder 55 is guided along the optical axis direction, while rotation about the optical axis is restricted by the guide-bars 57 and 58.

In the above-described lens driving apparatus, when the lead screw shaft 53 is rotated, by rotation of the step motor 5, the lens holder 55 receives a thrust force at the engaging portion 55a from the lead screw portion 53a. This thrust force moves the lens holder 55 with the lens 56 along the optical axis direction. The amount or degree of motion corresponds to revolutions of the step motor 5 in number and direction.

Since the output shaft 7 of the step motor 5 and the lead screw shaft 53 are disposed in a parallel arrangement as described above, the total length of the lens driving apparatus can be reduced, in comparison with an arrangement in which the step motor M and the lead screw shaft 53 are disposed in serial alignment. Despite the reduced overall length of the lens driving apparatus, the lead screw shaft 53 can be maintained at the same length or may even be longer than a lead screw shaft used in a conventional arrangement. In a conventional arrangement, the step motor and the lead screw shaft are disposed in serial alignment. Maintaining or increasing the length of the lead screw shaft 53 results, in part, because almost the entire overall length of the lens driving apparatus can be used to accommodate the lead screw portion 53a. As a result, the overall length of the lens driving apparatus is reduced and the lens 56 traveling range is increased.

Further, since this arrangement is designed such that the length of the step motor 5 has little effect on the overall length of the lens driving apparatus, the step motor 5 can be increased in size so as to increase the driving force.

Figure 2:
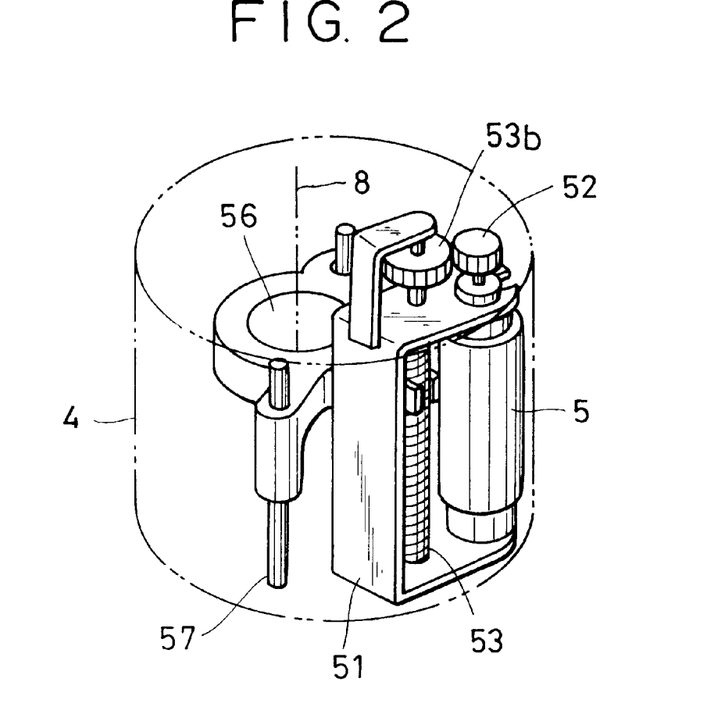
Figure 3:
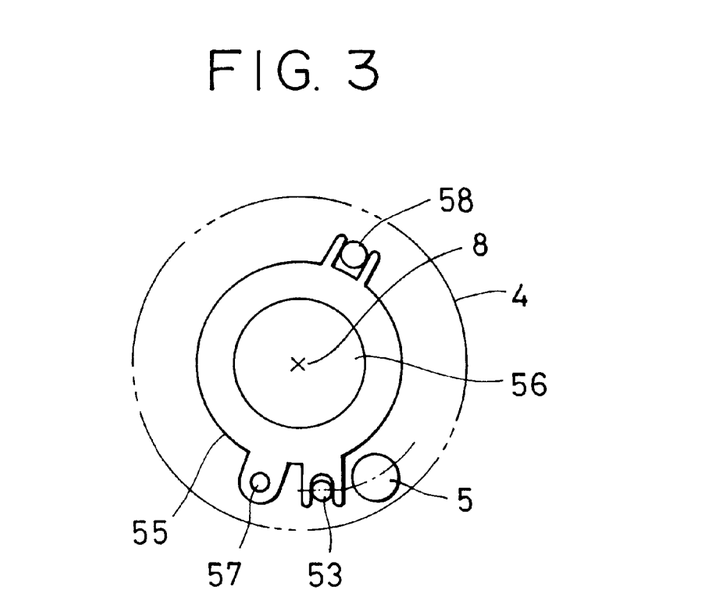

The above-mentioned lens driving apparatus is accommodated in a lens barrel 4 as shown in FIGS. 2 and 3. FIG. 2 is a perspective view of the lens barrel 4 and FIG. 3 is an optical axial view of the lens barrel 4. Chain lines in FIGS. 2 and 3 show the outline of the lens barrel 4.

As shown in FIG. 2, almost the entire lens driving apparatus is accommodated within the optical axis direction of the lens barrel 4. Therefore, when the lens barrel 4 is placed within an optical apparatus, such as a video camera, for example, the lens driving apparatus dose not limit the configuration of components of the optical apparatus.

As shown in FIG. 3, the center of the lead screw shaft 53 and the center of the step motor 5, output shaft 7 are disposed so as to be approximately aligned on the same circumference of a circle centered on the optical axis 8 of the lens 56. Accordingly, the diameter of the lens barrel 4 can be minimized. Additionally, since the lead screw shaft 53 and the step motor 5 are commonly held by the same frame 51, the gear portion 53b of the lead screw shaft 53 and the pinion gear 52 can be spaced or positioned with great accuracy.

Figure 4:
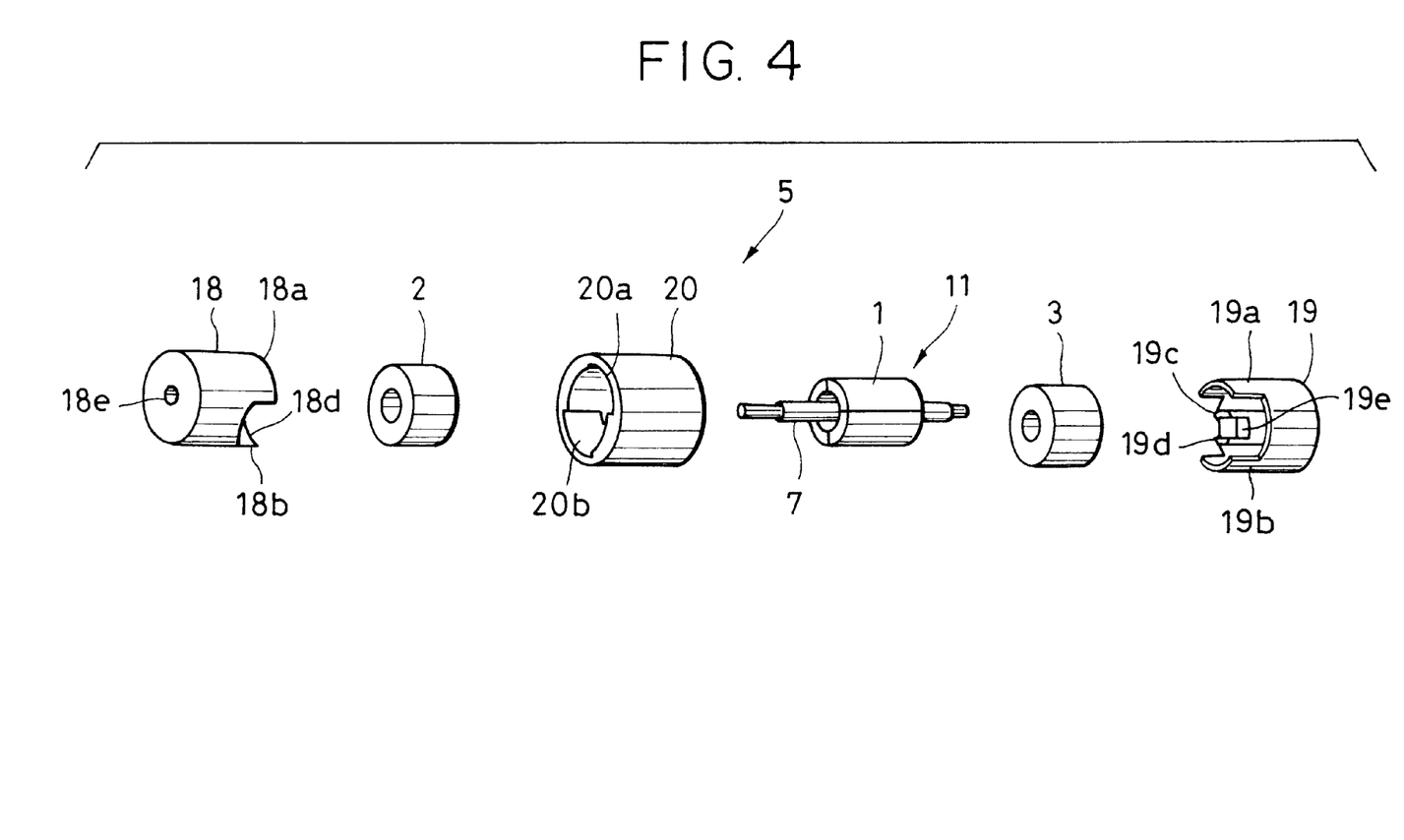
Figure 5:
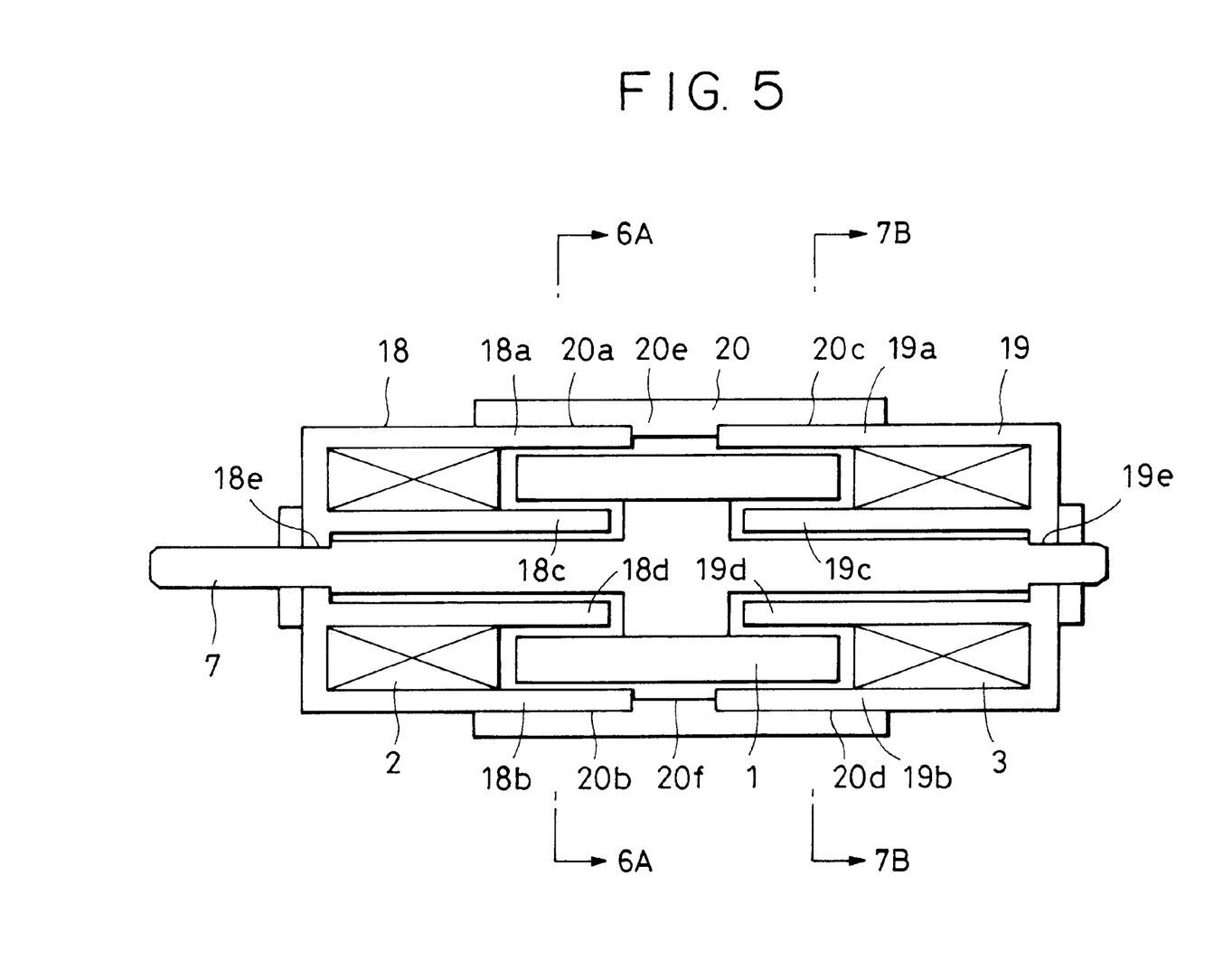

In order to achieve the advantages in the lens driving apparatus or the lens barrel 4 as described above, it is desirable that the step motor 5 be considerably longer in overall length, in comparison with its diameter. That is, the step motor 5 should be long and narrow. In this embodiment, a step motor 5 is formed as shown in FIGS. 4, 5, 6A–6D, and 7A–7D, to achieve the above-discussed requirements. FIG. 4 is an exploded and perspective view of the step motor 5. FIG. 5 is an axial cross-section view of the step motor 5. FIGS. 6A–6D are cross-section views at the line 6A–6A of FIG. 5, and FIGS. 7A–7D are cross-section views at the line 7B–7B of FIG. 5.

Referring to FIGS. 4, 6A–6D, and 7A–7D, a rotor 11 comprises a cylinder-shaped magnet 1. The magnet 1 periphery is divided into n (or multiple) portions (4 portions (1a–1d) in this embodiment) in the circumferential direction. Each portion is alternately magnetized to be either north or south. More specifically, as shown in FIGS. 6A–6D and 7A–7D, portions 1a and 1c are magnetized to be south while portions 1b and 1d are magnetized to be north. The rotor 11 further includes the magnet 1 and an output shaft (rotor shaft) 7, which is fixed to the magnet 1.

As shown in FIG. 4, cylinder-shaped first and second coils 2 and 3 are disposed concentrically with the magnet 1, one of the coils 2 and 3 are placed at each side of the magnet 1, in the direction of the magnet 1 center. The diameters of the coils 2 and 3 are similar to the diameter of magnet 1.

First and second stators 18 and 19, formed of soft-magnetic material, are disposed so as to be shifted from each other by a phase difference of 180/n° (45° in this embodiment), n being the number of magnet 1 periphery portions. The first and second stators 18 and 19 are formed of external cylinders and internal cylinders.

The first coil 2 is accommodated between the external cylinder and the internal cylinder of the first stator 18. When the first coil 2 is energized, the first stator 18 is magnetized. The end portions of the external and internal cylinders of the first stator 18 are formed of external magnetic poles 18a and 18b (first external magnetic poles) and internal magnetic poles 18c and 18d (first internal magnetic poles). Both of the internal magnetic poles 18c and 18d are disposed so as to be shifted from each other by a phase difference of 360/(n/2)°(180° in this embodiment). As a result, both of the internal magnetic poles 18c and 18d are in the same phase. The external magnetic pole 18a is disposed opposing the internal magnetic pole 18c, while the in external magnetic pole 18b is disposed opposing the internal magnetic pole 18d.

The external magnetic poles 18a and 18b, and the internal magnetic poles 18c and 18d of the first stator 18 oppose the external periphery and the internal periphery of the magnet 1, respectively. Additionally, the external 18a and 18b and internal 18c and 18d magnetic poles are disposed so as to place the front portion of the magnet 1 between the external 18a and 18b and internal 18c and 18d magnetic poles. Accordingly, magnetic flux generated by the first coil 2 cuts across the front portion of the magnet 1 (placed between the external magnetic poles 18a and 18b and the internal magnetic poles 18c and 18d) of the first stator 18. Hence, the magnetic flux effectively acts on the magnet 1 to increase the output power of the step motor 5.

Additionally, the front portion of the output shaft 7 is rotatably fitted in an aperture 18e of the first stator 18.

Similarly, the second coil 3 is accommodated between the external cylinder and the internal cylinder of the second stator 19. When the second coil 3 is energized, the second stator 19 is magnetized. The end portions of the external and internal cylinders of the second stator 19 are formed of external magnetic poles 19a and 19b (second external magnetic poles) and internal magnetic poles 19c and 19d (second internal magnetic poles). Both of the internal magnetic poles 19c and 19d are disposed so as to be shifted from each other by a phase difference of 360/(n/2)° (180° in this embodiment). As a result, both of the internal magnetic poles are in the same phase. The external magnetic pole 19a is disposed opposing the internal magnetic pole 19c while the external magnetic pole 19b is disposed opposing the internal magnetic pole 19d.

The external magnetic poles 19a and 19b and the internal magnetic poles 19c and 19d of the second stator 19 oppose the external periphery and the internal periphery of the end portion of the magnet 1, respectively. Additionally, the external 19a and 19b and internal 19c and 19d magnetic poles are disposed so as to place the rear portion of the magnet 1 between them. The rear portion of the output shaft 7 of the step motor 5 is rotatably fitted in an aperture 19e of the second stator 19. Accordingly, magnetic flux generated by the second coil 3 cuts across the rear portion of the magnet 1 (placed between the external magnetic poles 19a and 19b and the internal magnetic poles 19c and 19d) of the second stator 19. Hence, the magnetic flux effectively acts on the magnet 1 to increase the output power of the step motor 5.

Referring to FIG. 4, in the front end of a cylinder-shaped connecting ring 20, formed of a non-magnetic material, slots 20a and 20b are formed. In the rear end of the connecting ring 20, slots 20c and 20d are formed so as to be shifted from the slots 20a and 20b by a phase difference of 45°. The external magnetic poles 18a and 18b of the first stator 18 are fitted in the slots 20a and 20b, respectively. Likewise, the external magnetic poles 19a and 19b of the second stator 19 are fitted in the slots 20c and 20d, respectively. The first and second stators 18 and 19 are fixed to the connecting ring 20, by adhesion of the fitting portions.

Thus, the end of the external magnetic pole 18a of the first stator 18 opposes that of the external magnetic pole 19a of the second stator 19. Likewise, the end of the external magnetic pole 18b opposes that of the external magnetic pole 19b, while the end of the internal magnetic pole 18d opposes that of the internal magnetic pole 19d. Protruding portions 20e and 20f (formed at the internal periphery of the connecting ring 20) are fitted between the external magnetic poles 18a and 18b and the external magnetic poles 19a and 19b. Both stators 18 and 19 are fixed to the connecting ring 20, being spaced by the length of the protruding portions 20e and 20f in the axial direction.

Figure 6A:
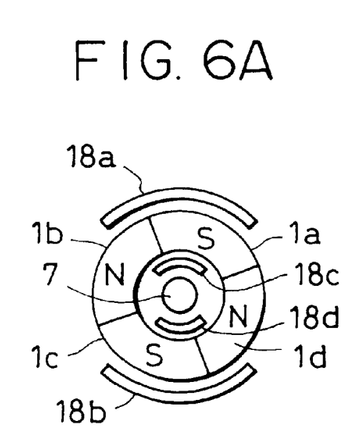
Figure 6B:
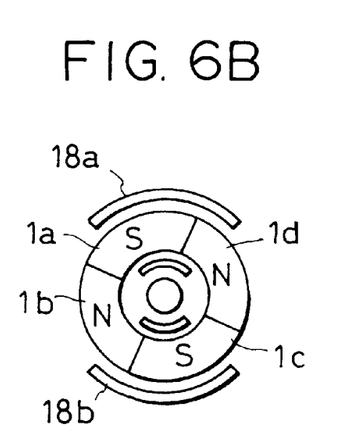
Figure 6C:
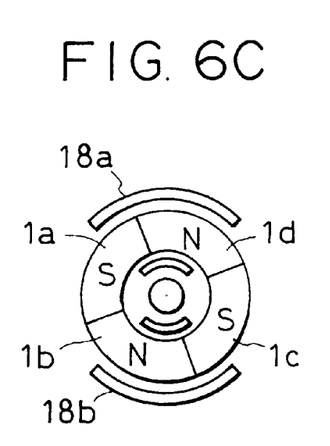
Figure 6D:
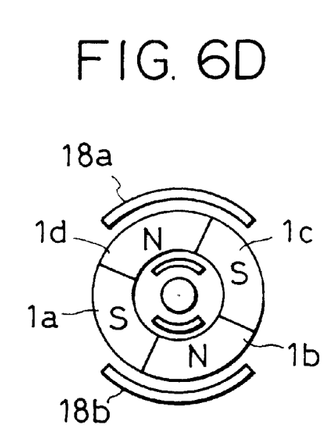
Figure 7A:
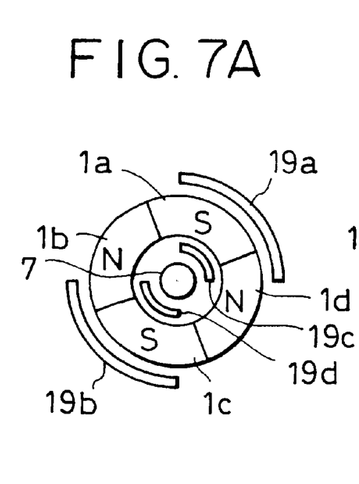
Figure 7B:
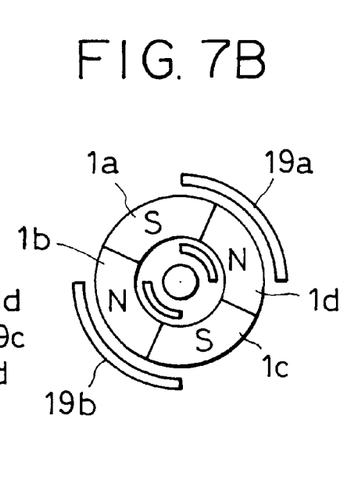
Figure 7C:
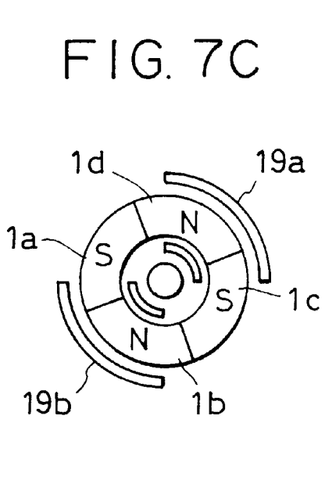
Figure 7D:
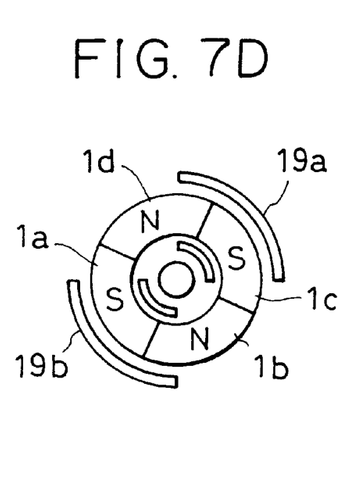

Referring to FIGS. 6A–6D and 7A–7D, the operation of the step motor 5 will now be described. FIGS. 6A and 7A show simultaneous states, while FIGS. 6B and 7B, FIGS. 6C and 7C, and FIGS. 6D and 7D show other simultaneous states, respectively.

From the state of FIGS. 6A and 7A, when the first and second coils 2 and 3 are energized, the external magnetic poles 18a and 18b of the first stator 18 are magnetized to be north, and the internal magnetic poles 18c and 18d are magnetized to be south, as well. Likewise, the external magnetic poles 19a and 19b of the second stator 19 are magnetized to be south and the internal magnetic poles 19c and 19d are magnetized to be north, as well. This results in the magnet 1 rotating counterclockwise, as viewed in the state showing in FIGS. 6B and 7B.

Then, when the first coil 2 is inversely energized, the external magnetic poles 18a and 18b of the first stator 18 are magnetized to be south, and the internal magnetic poles 18c and 18d are magnetized to be north, as well. Likewise, the external magnetic poles 19a and 19b of the second stator 19 are magnetized to be south and the internal magnetic poles 19c and 19d are magnetized to be north, as well. This results in the magnet 1 further rotating counterclockwise to the state showing in FIGS. 6C and 7C.

Further, when the coil 3 is inversely energized, the external magnetic poles 19a and 19b of the second stator 19 are magnetized to be north, and the internal magnetic poles 19c and 19d are magnetized to be south as well. Likewise, the external magnetic poles 18a and 18b of the first stator 18 are magnetized to be south and the internal magnetic poles 18c and 18d are magnetized to be north, as well. This results in the magnet 1 further rotating counterclockwise, to the state showing in FIGS. 6D and 7D.

By alternate switching of the energizing directions of the coils 2 and 3 in order, the magnet 1 rotates through the positions corresponding to the energized phase, in order, following the above-described cycles or states.

The reasons for making the step motor 5 long and narrow will now be described. That is, features of the basic configuration will be discussed to show that a long and narrow configuration, for the step motor 5, is most suitable for this embodiment. The basic step motor 5 configuration is as follows:

First, the magnet 1 is formed in a hollow cylindrical shape.

Second, the external periphery of the magnet 1 is divided into n or multiple portions in the circumferential direction, with each position being alternately magnetized into different magnetic poles.

Third, the magnet 1 is formed in the axial direction, in the following order; the first coil 2, the magnet 1, and then the second coil 3. That is, the coils 2 and 3 are disposed on both sides of the magnet 1, in the axial direction.

Finally, the external magnetic poles and the internal magnetic poles of the first and second stators 18 and 19, which are magnetized by the first and second coils 2 and 3, respectively, are opposed to the external and internal peripheries of the magnet 1, respectively.

Therefore, the diameter of the step motor 5 is small enough to contain the diameter of the magnet 1 and the space required to dispose, therein, the magnetic poles of the stators 18 and 19 opposing each other. This configuration produces a long and narrow shaped step motor 5.

Since the external dimensions of the step motor 5 depend on the diameters and axial lengths of the magnet 1 and the coils 2 and 3, the step motor 5 can be substantially miniaturized by reducing the diameters and axial lengths of the magnet 1 and the coils 2 and 3, respectively. However, when the diameters and axial lengths of the magnet 1 and the coils 2 and 3 are reduced, respectively, the output accuracy of the step motor may be difficult to maintain. The step motor 5 according to this Embodiment, however, solves the problem of the output accuracy. The problem is solved by employing a simple configuration in which the magnet 1 is formed in a hollow cylindrical shape and the external and the internal magnetic poles of the first and second stators 18 and 19 are respectively disposed, so as to oppose the external and internal peripheries of the magnet 1. Moreover, both the external periphery and the internal periphery of the magnet 1 is divided into multiple portions in the circumferential direction to be magnetized. Therefore, the output power of the motor is further increased.

Second Embodiment

Figure 8:
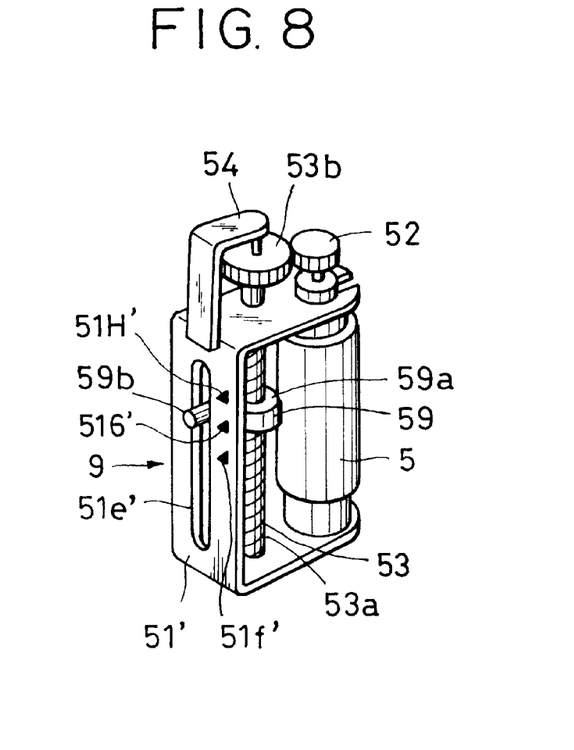
Figure 9:
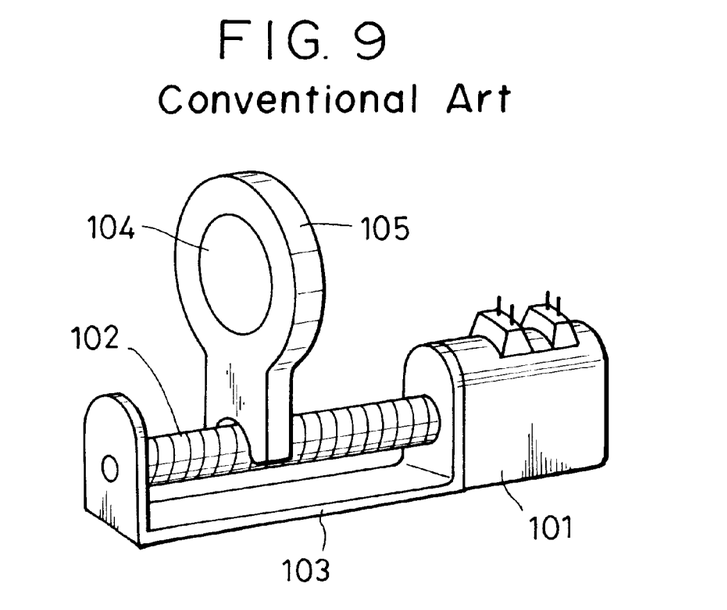
Figure 10:
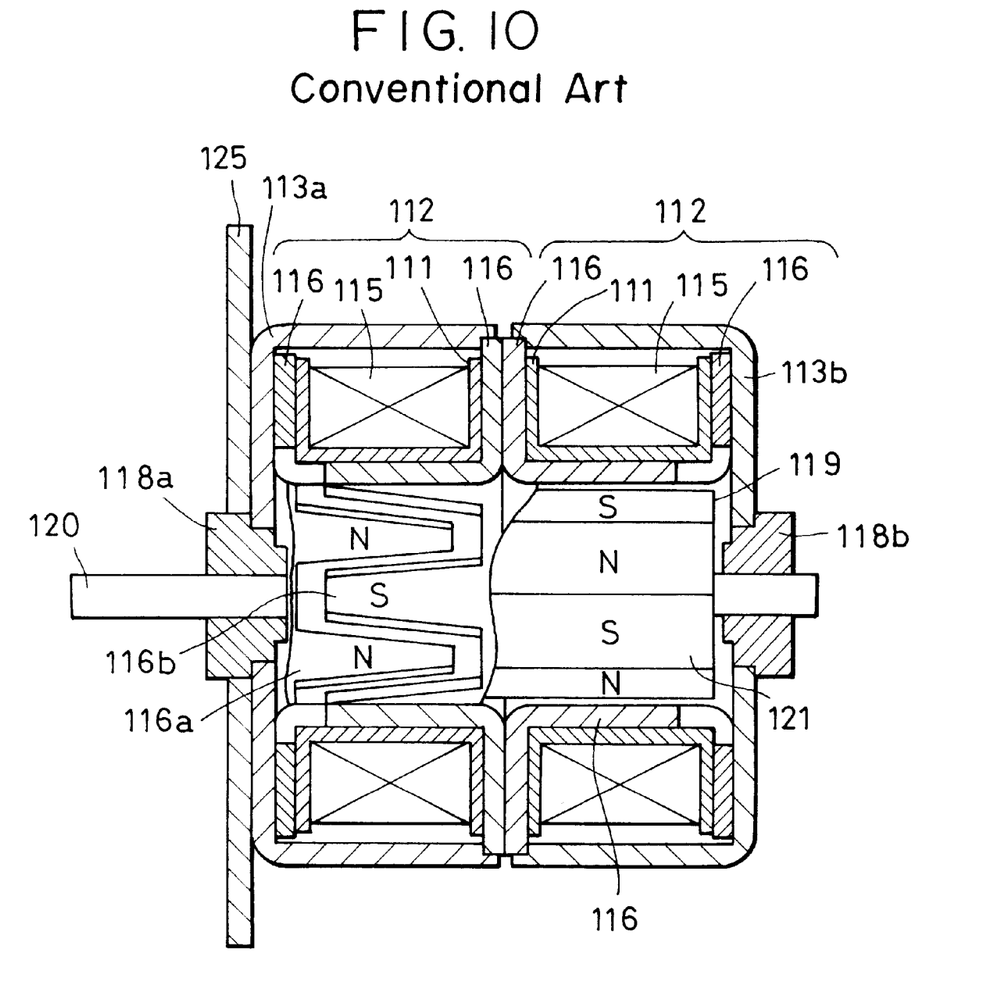

FIG. 8 illustrates an indicator 9 utilizing the driving apparatus according to the first embodiment. In the second embodiment, the step motor 5 and the lead screw shaft 53 and the same as those described in the first embodiment. Since the driving apparatus (according to the first embodiment) uses the long and narrow step motor 5, the driving apparatus is compact and the width thereof is particularly reduced. Therefore, it is also advantageous to use this apparatus in applications other than the lens driving in the first embodiment, because the driving range of the driven apparatus is wide, despite the overall short length of the driving apparatus.

In this embodiment, as an example of the above-mentioned advantage, an indicator in which the lead screw 53 drives a display member (driven member) 59, will be described.

The display member 59 has an internal screw portion 59a, which is mated with the lead screw portion 53a of the lead screw 53. The display member 59 has a pin portion 59b which is slidably fitted within a long slot 51e'. The slot 51e' is formed in a frame 51' in the axial direction of the lead screw shaft 53. By fitting the pin portion 59b to fit within the long slot 51e', rotation of the display member 59 is prevented. Alongside the long slot 51e' in the frame 51', markings 51f', 51g', and 51h' are calibrated, or positioned to correspond to specific measurements or events.

In the indicator 9 formed as above, when step motor 5 rotates to rotate the lead screw shaft 53, the display member 59 slides along the long slot 51e' by a driving force received at the internal screw portion 59a by the lead screw portion 53a. The position of the pin portion 59b of the display member 59 versus the markings 51f', 51g', or 51h' enables a meter and the like to display values.

Since the lead screw shaft 53 and the step motor M are commonly held by the same frame 51', the gear portion 53b of the lead screw shaft 53 and the pinion gear 52 can be spaced with great accuracy, thus permitting accurate measurements or metering

What is claimed is:

1. An optical apparatus, comprising:
    a movable lens unit;
    a rotatable lead screw moving said movable lens unit; and
    a motor driving said rotatable lead screw, wherein said motor and said rotatable lead screw are disposed in a side-by-side parallel arrangement, and the center of said motor and the center of said lead screw are disposed so as to be aligned on substantially the same circumference of a circle centered on an optical axis of a lens in said movable lens unit.

2. An optical apparatus according to claim 1, further comprising a holding member which holds said motor and said lead screw.

3. An optical apparatus according to claim 1, wherein overall lengths of said motor and said lead screw are substantially the same.

4. An optical apparatus according to claim 1, wherein said motor is a step motor.

5. An optical apparatus according to claim 4, wherein said step motor comprises:
    a magnet formed in a cylindrical shape, wherein at least the external magnet periphery is circumferentially divided into multiple portions, and wherein each of the multiple portions are alternately magnetized into north and south magnetic poles;
    first and second coils provided in the axial direction of said magnet, wherein said first coil is disposed on a first side of said magnet, and said second coil is disposed on a second side of said magnet;
    a first external magnetic pole, magnetized by said first coil and opposed to the external periphery of a first end of said magnet;
    a first internal magnetic pole, magnetized by said first coil and opposed to the internal periphery of the first end of said magnet;
    a second external magnetic pole, magnetized by said second coil and opposed to the external periphery of a second end of said magnet; and
    a second internal magnetic pole, magnetized by said second coil and opposed to the internal periphery of the second end of said magnet.

6. An optical apparatus according to claim 1, wherein said movable lens unit comprises a lens, a lens holder, and an engaging portion.

7. An optical apparatus according to claim 6, wherein said engaging portion comprises an internal thread engageable with said rotatable lead screw.

8. An optical apparatus according to claim 6, wherein said lens holder further comprises a swing-stopping slot portion and a guide aperture portion.

9. An optical apparatus according to claim 1, wherein said rotatable lead screw comprises a lead screw portion, a gear portion, and an end portion.

10. An optical apparatus according to claim 1, wherein said motor further comprises an output shaft connectable to a pinion gear.

11. An optical apparatus comprising:

a movable lens unit;

a rotatable lead screw moving said movable lens unit; and a motor driving said rotatable lead screw, wherein said motor comprises two stators disposed in the axial direction of said lead screw, and said motor and said rotatable lead screw are disposed in a side-by-side parallel arrangement, and the center of said motor and the center of said lead screw are disposed so as to be aligned on substantially the same circumference of a circle centered on an optical axis of a lens in said movable lens unit.

12. An optical apparatus according to claim 11, wherein said two stators are fixed to a connecting member comprised of non-magnetic material.

13. An optical apparatus according to claim 11, wherein said two stators each comprise a double cylindrical structure.

14. An optical apparatus according to claim 13, wherein said double-cylindrical structure comprises an internal cylindrical portion and an external cylindrical portion.

15. An optical apparatus according to claim 14, wherein a coil is accommodated between the external and internal cylindrical portions of each of said two stators.

16. An optical apparatus according to claim 11, further comprising a holding member positioning said motor and said rotatable lead screw.

17. An optical apparatus according to claim 11, wherein the overall length of said motor and the overall length of said lead screw are substantially the same.

18. An optical apparatus according to claim 11, wherein said motor is a step motor.

19. An optical apparatus according to claim 11, wherein said movable lens unit comprises a lens, a lens holder, and an engaging portion.

20. An optical apparatus according to claim 19, wherein said engaging portion comprises an internal thread connectable with said rotatable lead screw.

21. An optical apparatus according to claim 19, wherein said lens holder further comprises a swing-stopping slot portion and a guide aperture portion.

22. An optical apparatus comprising:

a movable lens unit;

a rotatable lead screw moving said movable lens unit; and a step motor driving said rotatable lead screw, wherein said step motor comprises two coils disposed in the axial direction of said lead screw, and said step motor and said rotatable lead screw are disposed in a side-by-side parallel arrangement, and the center of said step motor and the center of said lead screw are disposed so as to be aligned on substantially the same circumference of a circle centered on an optical axis of a lens in a movable lens unit.

23. An optical apparatus according to claim 22, wherein the total lengths of said motor and said rotatable lead screw are substantially the same.

24. An optical apparatus comprising:

a movable lens unit;

a rotatable lead screw moving said movable lens unit; and a step motor driving said rotatable lead screw, said step motor comprising:

a magnet formed in a cylindrical shape, wherein at least the external magnet periphery is circumferentially divided into multiple portions, and wherein each of the multiple portions are alternately magnetized into different magnetic poles;

first and second coils provided in the axial direction of said magnet, wherein said first coil is disposed on a first side of said magnet, and said second coil is disposed on a second side of said magnet;

a first external magnetic pole, magnetized by said first coil and opposed to the external periphery of a first end of said magnet;

a first internal magnetic pole, magnetized by said first coil and opposed to the internal periphery of the first end of said magnet;

a second external magnetic pole, magnetized by said second coil and opposed to the external periphery of a second end of said magnet; and a second internal magnetic pole, magnetized by said second coil and opposed to the internal periphery of the second end of said magnet, wherein said step motor is disposed in a side-by-side parallel arrangement to said lead screw and the center of said step motor and the center of said lead screw are disposed so as to be aligned on substantially the same circumference of a circle centered on an optical axis of a lens in said movable lens unit.

25. An optical apparatus comprising:

a movable lens unit;

a rotatable lead screw moving said movable lens unit;

a motor driving said rotatable lead screw; and a holding member which holds both said rotatable lead screw and said motor so as to be disposed in a direction parallel to an optical axis of a lens in said movable lens unit, wherein said motor and said rotatable lead screw are disposed in a side-by-side parallel arrangement, and the center of said motor and the center of said lead screw are disposed so as to be aligned on substantially the same circumference of a circle centered on an optical axis of a lens in said movable lens unit.

26. An optical apparatus according to claim 25, wherein said rotatable lead screw comprises a lead screw portion, a gear portion, and an end portion.

27. An optical apparatus according to claim 26, wherein said motor further comprises an output shaft connectable to a pinion gear.

28. A driving apparatus, comprising:

a movable display member unit;

a rotatable lead screw moving said movable display unit;

a motor driving said rotatable lead screw; and a holding member which holds both said lead screw and said motor so that said lead screw and said motor are disposed in a side-by-side, parallel arrangement, wherein the overall length of said motor and the overall length of said lead screw are substantially the same.

29. A driving apparatus according to claim 28, wherein said motor is a step motor.

30. A driving apparatus according to claim 29, wherein said step motor comprises:

a magnet formed in a cylindrical shape, wherein at least the external magnet periphery is circumferentially divided into multiple portions, and wherein each of the multiple portions are alternately magnetized into north and south magnetic poles;

first and second coils provided in the axial direction of said magnet, wherein said first coil is disposed on a first side of said magnet, and said second coil is disposed on a second side of said magnet;

a first external magnetic pole, magnetized by said first coil and opposed to the external periphery of a first end of said magnet;

a first internal magnetic pole, magnetized by said first coil and opposed to the internal periphery of the first end of said magnet;

a second external magnetic pole, magnetized by said second coil and opposed to the external periphery of a second end of said magnet; and a second internal magnetic pole, magnetized by said second coil and opposed to the internal periphery of the second end of said magnet.

31. A driving apparatus according to claim 28, wherein said rotatable lead screw comprises a lead screw portion, a gear portion, and an end portion.

32. A driving apparatus according to claim 30, wherein said step motor further comprises an output shaft connectable to a pinion gear.

33. A driving apparatus according to claim 28, wherein said movable display member unit comprises an internal screw portion and a pin portion.

34. A driving apparatus according to claim 28, wherein said holding member further comprises a slot formed in the axial direction of the rotatable lead screw, wherein said pin portion is slidably fitted within said slot.

* * * * *

UNITED STATES PATENT AND TRADEMARK OFFICE
CERTIFICATE OF CORRECTION

PATENT NO. : 6,317,562 B1  
DATED : November 13, 2001  
INVENTOR(S) : Chikara Aoshima Page 1 of 1

It is certified that error appears in the above-identified patent and that said Letters Patent is hereby corrected as shown below:

Column 4,  
Line 1, "guide-bars" should read -- guide bars --.

Column 5,  
Line 32, "the in" should read -- the --.

Column 8,  
Line 20, "metering" should read -- metering. --.

Signed and Sealed this

Twenty-first Day of May, 2002

Attest:

JAMES E. ROGAN  
*Director of the United States Patent and Trademark Office*

*Attesting Officer*